United States Patent

Diaz et al.

Patent Number: 6,132,546
Date of Patent: Oct. 17, 2000

[54] METHOD FOR MANUFACTURING HONEYCOMB MATERIAL

[75] Inventors: Rodolfo Enrique Diaz, Phoenix; Victoria Ann Weinberg, Gilbert, both of Ariz.; Michael Joseph Capoccia, Huntington Beach, Calif.

[73] Assignee: Northrop Grumman Corporation, Los Angeles, Calif.

[21] Appl. No.: 09/226,793

[22] Filed: Jan. 7, 1999

[51] Int. Cl.[7] .............................. B32B 3/12; B32B 31/24
[52] U.S. Cl. .................. 156/197; 156/275.3; 156/275.5; 156/290; 156/307.1
[58] Field of Search .............................. 156/197, 272.2, 156/273.3, 275.1, 275.3, 275.5, 275.7, 290, 307.1

[56] References Cited

U.S. PATENT DOCUMENTS

| | | | |
|---|---|---|---|
| 2,992,673 | 7/1961 | Bishop | 154/1.6 |
| 3,011,672 | 12/1961 | Vasek | 217/30 |
| 3,035,952 | 5/1962 | Gwynne | 156/512 |
| 3,066,722 | 12/1962 | Adams et al. | 156/470 |
| 3,077,223 | 2/1963 | Hartselle et al. | 156/548 |
| 3,114,666 | 12/1963 | Johnson | 156/197 |
| 3,235,431 | 2/1966 | Paige | 156/197 |
| 3,356,555 | 12/1967 | Jackson | 156/205 |
| 3,598,676 | 8/1971 | Noble | 156/205 |
| 3,637,448 | 1/1972 | Siegal et al. | 156/197 |
| 3,660,217 | 5/1972 | Kehr et al. | 156/197 |
| 4,205,118 | 5/1980 | Schubert | 428/594 |
| 4,249,974 | 2/1981 | Wilson | 156/85 |
| 4,255,752 | 3/1981 | Noble et al. | 343/771 |
| 4,353,355 | 10/1982 | Stewart | 126/445 |
| 4,353,769 | 10/1982 | Lee | 156/299 |
| 4,415,342 | 11/1983 | Foss | 55/96 |
| 4,598,449 | 7/1986 | Monhardt et al. | 29/157 |
| 4,617,072 | 10/1986 | Merz | 156/89 |
| 4,680,220 | 7/1987 | Johnson | 428/241 |
| 4,720,713 | 1/1988 | Chang et al. | 343/912 |
| 4,816,097 | 3/1989 | Williams et al. | 156/247 |
| 4,824,711 | 4/1989 | Cagliostro et al. | 428/116 |
| 4,861,404 | 8/1989 | Neff | 156/204 |
| 4,948,445 | 8/1990 | Hees | 156/196 |
| 4,956,393 | 9/1990 | Boyd et al. | 521/54 |
| 4,957,883 | 9/1990 | Kobayashi et al. | 501/35 |
| 4,966,611 | 10/1990 | Schumachere et al. | 55/20 |
| 5,078,818 | 1/1992 | Han et al. | 156/89 |
| 5,079,064 | 1/1992 | Forsythe | 428/131 |
| 5,089,455 | 2/1992 | Ketcham et al. | 501/104 |
| 5,102,727 | 4/1992 | Pittman et al. | 428/259 |
| 5,134,421 | 7/1992 | Boyd et al. | 343/872 |
| 5,167,870 | 12/1992 | Boyd et al. | 525/540 |
| 5,188,779 | 2/1993 | Horikawa et al. | 264/62 |
| 5,198,282 | 3/1993 | Baker et al. | 428/114 |
| 5,217,556 | 6/1993 | Fell | 156/205 |
| 5,224,249 | 7/1993 | Kornely, Jr. | 29/6.1 |
| 5,231,059 | 7/1993 | Leung et al. | 501/12 |
| 5,288,537 | 2/1994 | Corden | 428/116 |
| 5,298,314 | 3/1994 | Even et al. | 428/245 |
| 5,312,511 | 5/1994 | Fell | 156/469 |
| 5,322,725 | 6/1994 | Ackerman et al. | 428/137 |
| 5,344,685 | 9/1994 | Cassell | 428/66 |
| 5,451,444 | 9/1995 | Deliso et al. | 428/116 |
| 5,503,887 | 4/1996 | Diaz et al. | 428/58 |
| 5,637,175 | 6/1997 | Feygin et al. | 156/264 |

FOREIGN PATENT DOCUMENTS 1196362  7/1965  Germany .

Primary Examiner—Michael W. Ball
Assistant Examiner—Michael A Tolin
Attorney, Agent, or Firm—Terry J. Anderson; Karl J. Hoch, Jr.

[57] ABSTRACT

A method for manufacturing a honeycomb structure includes applying an electron beam curable polymer material to a generally planer material, placing two sheets of the planer material in laminar juxtaposition with one another, and forming and curing nodelines between adjacent sheets of the planar material with an electron beam.

9 Claims, 2 Drawing Sheets

METHOD FOR MANUFACTURING HONEYCOMB MATERIAL

FIELD OF THE INVENTION

The present invention relates generally to methods for manufacturing honeycomb materials such as those commonly used in the fabrication of aircraft, structural panels, skies, and other items where reduced weight and high strength is desirable. The present invention relates more particularly to a method for manufacturing a honeycomb structure utilizing an electron beam to cure a polymer material so as to define the nodelines which attach adjacent sheets of material to one another so as to define the honeycomb.

BACKGROUND OF THE INVENTION

The use of honeycomb material in aircraft, structural panels, skies and the like is well known. Such honeycomb material provides a low cost, lightweight, high strength material suitable for use in applications having stringent weight and strength requirements.

Such contemporary honeycomb material is typically formed by applying spaced apart lines of adhesive intermediate adjacent sheets of planar material such as cardboard, paperboard, glass roving, kevlar, etc., in an alternating manner which, when expanded, defines the plurality of cells of a honeycomb material.

As those skilled in the art will appreciate, such nodelines must be formed between adjacent sheets of planar material in an accurate manner, such that, when expanded, the desired honeycomb pattern is formed. This is typically accomplished by applying the nodelines to a sheet of the planar material and then accurately stacking each sheet of the planar material. Such stacking must be accomplished with care, so as to provide the desired alignment. When such stacking is performed by hand, time must be taken to assure that the edges of the sheets are aligned with one another. Jigs or fixtures may be utilized to facilitate such alignment.

Frequently, after the stack of bonded together sheets has been expanded in an accordion-like fashion so as to define a block of open cell honeycomb material, the block is then dipped into a resin, typically a plurality of times, so as to densify it and attain the necessary fiber to resin ratio for the finished composite product.

Those skilled in the art will appreciate that the contemporary process for forming such a honeycomb structure is comparatively elaborate and time consuming. Thus, it is desirable to provide a means for simplifying the process for forming such honeycomb structure, thereby reducing the time and cost associated therewith.

SUMMARY OF THE INVENTION

The present invention addresses and alleviates the above mentioned deficiencies associated with the prior art. More particularly, the present invention comprises a method for manufacturing a honeycomb structure. The method comprises the steps of applying an electron beam curable polymer material to a generally planar material, placing two sheets of the planar material in laminar juxtaposition with one another, and forming while simultaneously curing nodelines between adjacent sheets of the planar material with an electron beam.

More particularly, the method of the present invention comprises laminating both sides of a web material with an electron beam curable polymer film, cutting the web material into sheets, stacking the sheets and curing nodelines so as to attach laminarly juxtaposed sheets to one another, expanding the stack, and curing the polymer film on the free walls i.e., non-attached portions, of the expanded stack.

The step of stacking the cut sheets of web material and curing nodelines to attach laminarly juxtaposed sheets to one another is preferably performed by performing the steps of placing one sheet of the web material onto a stack of sheets of the web material, compressing the stack, and curing nodelines between the top two sheets of the web material in the stack with an electron beam.

The step of laminating both sides of the web material with an electron beam curable polymer film preferably comprises laminating both sides of a glass web. Alternatively, the step of laminating both sides of a web material of an electron beam curable polymer material comprises laminating both sides of a Nomex™ web. Those skilled in the art will appreciate that various other web materials are likewise suitable.

The method of laminating both sides of the web material with an electron beam curable polymer material comprises laminating both sides of a Nomex™ web. Those skilled in the art will appreciate that various other web materials are likewise suitable.

The method of laminating both sides of the web material with an electron beam curable polymer film preferably comprises laminating both sides of the web material with an electron beam polymer material such as Fiberite 977-3 or Fiberite 3501-6, to which a cationic curing catalyst (such as that manufactured by General Electric) has been added. Those skilled in the art will appreciate that various other electron beam curable polymer films are likewise suitable.

According to the preferred embodiment of the present invention, the step of cutting the web material into sheets comprises cutting the web material into either rectangles or parallelograms. As those skilled in the art will appreciate, cutting the web of material into sheets results in a generally rectangular honeycomb structure, while cutting the web material into parallelograms results in a solid prism of material. Alternatively, the web material may be cut into any desired shape, so as to form any desired solid structure.

The steps of stacking the sheets comprises that stacking the sheets such that sheets are generally aligned to one another. That is, a jig or fixture is preferably utilized so as to stack the sheets such the edges thereof are generally co-aligned. However, as discussed in detail below, alignment of the sheets is not as important in the practice of the present invention as it is in the prior art. The present invention tolerates a much greater degree of misalignment than the prior art does.

The step of stacking the sheets and curing nodelines to attach laminarly juxtaposed sheets to one another comprises moving an electron beam cure module down onto the stack so as to compress the stack and then drawing the desired nodelines with a raster scan electron beam. Alternatively, the electron beam is vector scanned so as to define each nodeline more efficiently, i.e., without scanning the entire surface of the sheet of web material.

Curing the polymer film on the free walls, i.e., those portions of the web material which do not define nodelines, of the expanded stack preferably comprises curing the polymer film by heating the expanded stack in an oven. Such curing of the polymer film is performed at temperatures and pressures well known in the art. Such curing is preferably performed so as to cause the polymer film on the free walls of the expanded stack to partially reflow, penetrate the web, and cure.

These, as well as other advantages of the present invention, will more apparent from the following description and drawings. It is understood that changes in the specific structure shown and described may be made within the scope of the claims without departing from the spirit of the invention.

DETAILED DESCRIPTION OF THE PREFERRED INVENTION

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
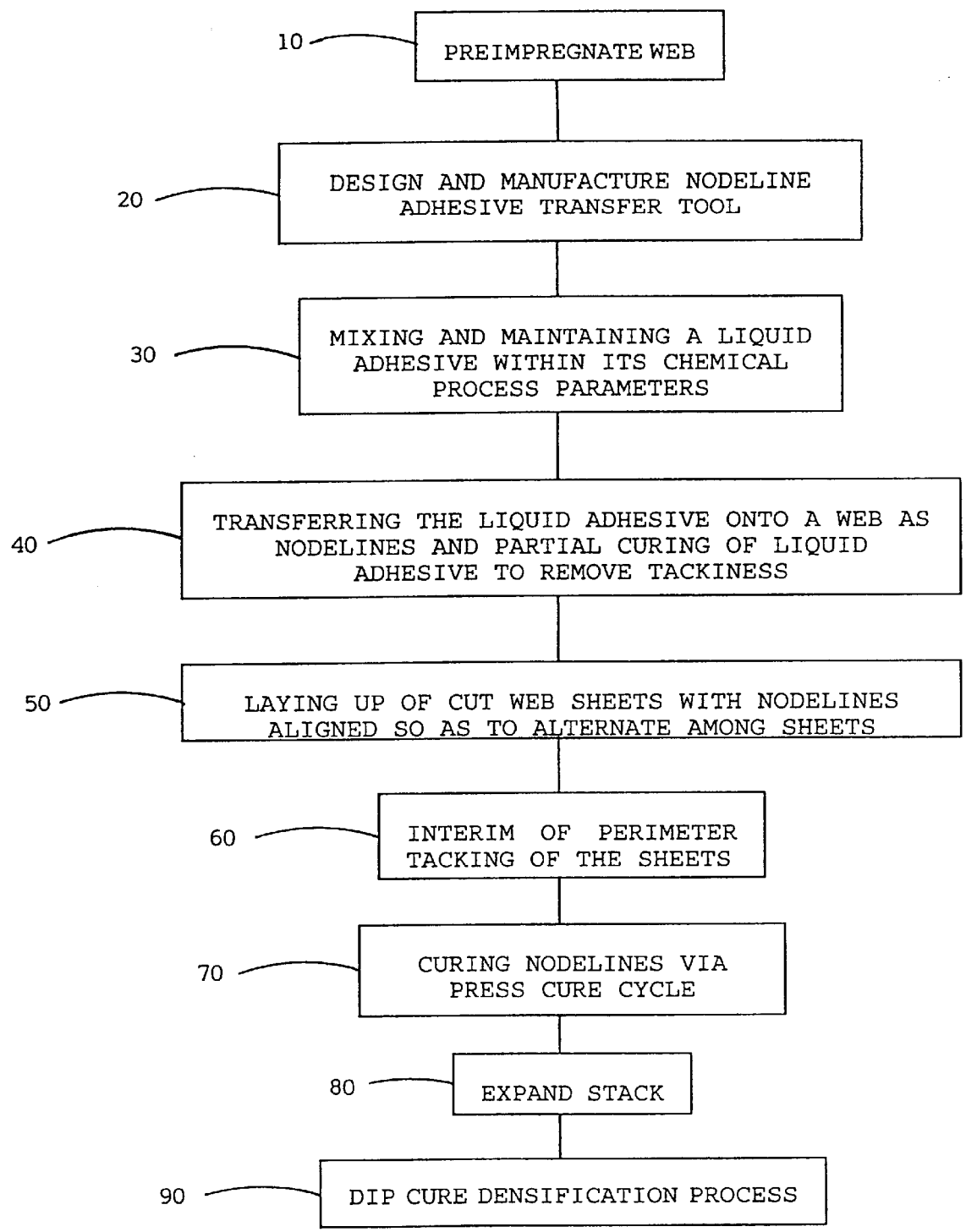
FIG. 1 is a flow chart showing the method of forming a honeycomb structure according to the prior art.

Referring now to FIG. 1, the contemporary method for forming a honeycomb structure comprises the steps of pre-impregnating 10 the web. Such webs typically comprise a glass roving, i.e., fiberglass, which is typically wound upon a spool.

A nodeline adhesive transfer tool must be designed and manufactured 20 so as to facilitate the formation of adhesive nodelines upon adjacent layers of the web. The nodelines alternate in position, i.e., the nodelines for adjacent layers are formed so as to be positioned intermediate one another such that expansion of a stack of sheets of the web material results in the desired honeycomb structure, according to well known methodology. A contemporary process for forming honeycomb structures is disclosed in U.S. Pat. No. 3,235,431 issued on Feb. 15, 1996 to R. E. Paige and entitled METHOD OF PRODUCING HONEYCOMB ARTICLES, the contents of which are hereby incorporated by reference.

The liquid adhesive is mixed and maintained 30 within its chemical process parameters. That is, the chemical liquid adhesive must be formed according to a well defined and comparatively complex procedure, so as to provide the desired proportions and also must frequently be maintained at a desired temperature and/or pressure so as to maintain the desired physical properties thereof, i.e., prevent premature curing thereof. By maintaining the liquid adhesive within its desired chemical process parameters, the desired viscosity, solid content, and other physical properties thereof are maintained.

The liquid adhesive is transferred onto the cut sheets of web material so as to define nodelines and the nodelines are at least partially cured 40 in order to remove tackiness therefrom.

Laying up of the cut web sheets with the nodelines aligned 50 so as to alternate among sheets is performed either by hand or utilizing machine vision assist. Interim perimeter tacking 60 of the sheets is next performed so as to maintain the sheets in the desired alignment thereof. The nodelines are then cured 70 during a press cycle, i.e., the application of pressure so as to compress the stack.

After the nodelines have been cured, then the stack is expanded 80 so as to form the desired honeycomb structure.

Optionally, the expanded honeycomb structure is subjected to a dip cure 90 so as to provide additional densification of the material. This process may be repeated as desired.

Thus, as those skilled in the art will appreciate, the contemporary methodology for forming a honeycomb structure is comparatively complex and time consuming. More particularly, a number of steps are associated with the formation of nodelines which attach adjacent sheets of web material to one another. Thus, it is desirable to provide a method for simplifying the process of forming a honeycomb material, particularly the steps associated with the formation of nodelines therefore.

Figure 2:
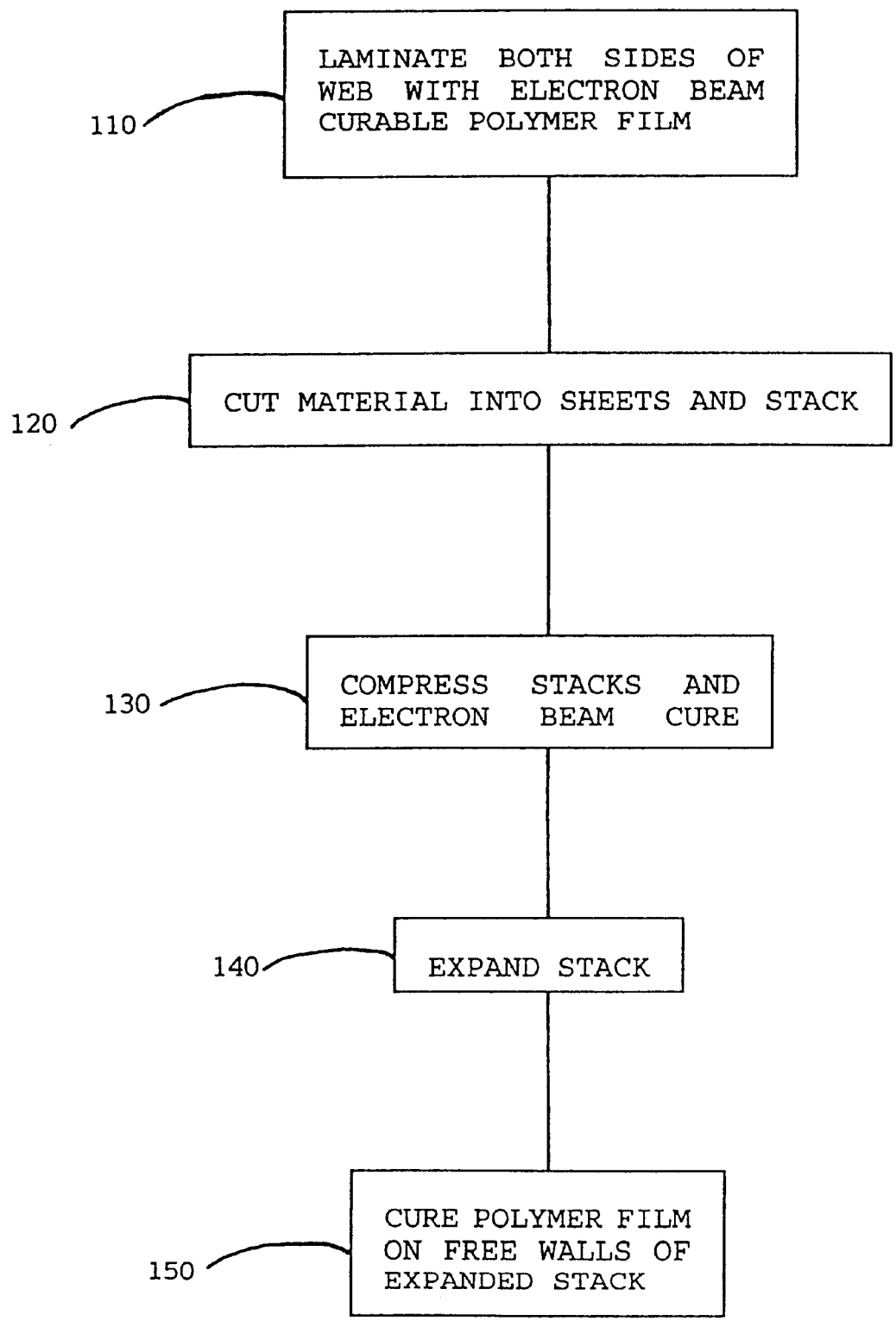
FIG. 2 is a flow chart showing a method for manufacturing a honeycomb structure utilizing an electron beam for defining and curing nodelines according to the present invention.

Referring now to FIG. 2, the method for manufacturing a honeycomb structure according to the present invention is shown. Both sides of the web material are laminated 110 with an electron beam polymer material such as Fiberite 977-3 or Fiberite 3501-6, to which a cationic curing catalyst (such as that manufactured by General Electric) has been added so as to make the normally heat curable epoxy polymer electron beam curable. Those skilled in the art will appreciate that various other electron beam curable polymer films are likewise suitable. The electron beam curable polymer film will both serve as an adhesive and a densification resin so as to provide the desired degree of densification or encapsulation of the web.

The web material is then cut 120 into sheets and stacked. This sheeting process is preferably performed as the web material unrolls from a roll. The web material is preferably cut into rectangles, although it may alternatively be cut into parallelograms, triangles, hexagonals, octagonals, or any other desired shape.

When the sheets are cut so as to form parallelograms, then the nodelines are preferably drawn at 45°, perpendicular to the diagonally cut edges so that the web fibers will run at 45° and 135° to the nodelines.

The stack is compressed and an electron beam is used to define and cure nodelines in the electron beam curable polymer film, so as to attach adjacent layers of the web material to one another. Thus, as each sheet falls onto the receiving stack, an electron beam cure process module preferably drops down, compresses the stack, and draws, using a raster scan, the desired pattern of nodelines with an electron beam. By accurately controlling the power, dimensions, and penetration of the electron beam, each sheet dropped onto the stack is fused onto the previous top sheet of the stack via the real time curing of the polymer film laminate of both adjacent sheets.

The stack is then expanded 140 via any desired conventional process, e.g., by blowing air into the stack so as to cause the cells of the honeycomb material to expand or by pulling the top and bottom of the stack away from one another.

The expanded honeycomb material is then placed in an oven and cured 150 so as to cause the polymer film on the free walls of the expanded stack to partially reflow, penetrate the web, and cure. This provides the desired densification resin for the composite material.

Since the electron beam only needs to penetrate through the thickness of two sheets of polymer so as to cure the film, the power requirement for the electron beam is very low, typically on the level of the power requirement for a black and white television.

The electron beam press cure module is preferably a flat screen cathode ray tube which is lowered onto the stack. Conventional programming methodology is used to direct the trace so as to form the desired pattern of nodelines on the sheet.

No particular alignment is required of the sheeted material. It must merely lay flat on the stack. The computer drawn nodelines tend to preserve the squareness of the final block, mitigating any need for physical alignment of the sheets. Thus, alignment is much less critical according to the present invention than according to contemporary methodology. That is, a stack formed according to contemporary methodology need not be precisely aligned since the whole stack, after it has been bonded at the node lines thereof, may be trimmed square, if necessary. This is true because the computer drawn nodelines are properly positioned relative to one another, i.e., upon different layers of the stack, since the alignment of the electron beam press cure module relative to the stack does not vary substantially.

Alternatively, the cure press module of the present invention may utilize an ultraviolet light source and indexed screens, i.e., a mask, so as to effect the formation and curing of nodelines. In this instance, an ultraviolet curable polymer would be utilized.

The present invention thus eliminates the need of many different devices required when practicing the conventional methodology. For example, no dip tanks or their associated hazardous waste are required. Further, programmed block handlers for dipping are not required. Further, no HOBE press or monitoring of the cure cycle of the nodelines is required. No reconstruction tables or reconstruction line cure oven for the glass is required. Further, no pre-preg tower, nor its associated chemicals are required. Thus, as those skilled in the art will appreciate, the present invention substantially reduces the cost complexity and environmental hazards associated with the manufacture of honeycomb structures.

It is understood that the exemplary method for manufacturing a honeycomb structure described herein and shown in the drawings represents only a presently preferred embodiment of the invention. Indeed, various modifications and additions may be made to such embodiment without departing from the spirit and scope of the invention. For example, different shapes or configurations of the cut sheets of web material are contemplated. Further, various different types of web material, and various different polymers may be utilized. Thus, these and other modifications and additions may be obvious to those skilled in the art and may be implemented to adapt the present invention for use in a variety of different applications.

What is claimed is:

1. A method for manufacturing a honeycomb structure, the method comprising steps of:
   a) laminating both sides of a web material with an electron beam curable polymer film;
   b) cutting the web material into sheets;
   c) stacking the sheets and curing nodelines to attach laminarly juxtaposed sheets to one another by performing the steps of:
      i) placing one sheet of the web material onto a stack of sheets of the web material;
      ii) compressing of the stack;
      iii) curing nodelines between the top two sheets of the web material in the stack with an electron beam;
   d) expanding the stack; and
   e) curing the polymer film on free walls of the expanded stack.

2. The method as recited in claim 1, wherein the step of laminating both sides of a web material with an electron beam curable polymer film comprises laminating both sides of a glass web.

3. The method as recited in claim 1, wherein the step of laminating both sides of the web material with an electron beam curable polymer film comprises laminating both sides of the web material with an epoxy polymer having a cationic curing catalyst added thereto.

4. The method is recited in claim 1, wherein the step of cutting the web material into sheets comprises cutting the web material into rectangles.

5. The method is recited in claim 1, wherein the step of cutting the web material into sheets comprises cutting the web material into parallelograms.

6. The method as recited in claim 1, wherein the step of stacking the sheets comprises stacking the sheets such that the sheets are generally aligned with one another.

7. The method as recited in claim 1, wherein the step of stacking the sheets and curing nodelines to attach laminarly juxtaposed sheets to one another comprises moving an electron beam cure module down onto the stack so as to compress the stack and then drawing the desired nodelines with a raster scanned electron beam.

8. The method as recited in claim 1, wherein the step of curing the polymer film on free walls of the expanded stack comprises curing in the polymer film by heating the expanded stack in an oven.

9. The method as recited and claim 1, wherein the step of curing the polymer film on free walls of the expanded stack comprises curing the polymer film in a manner which causes the polymer film on the free walls to partially reflow, penetrate the web, and cure.

* * * * *